(12) United States Patent  (10) Patent No.: US 8,041,132 B2
Yan  (45) Date of Patent: Oct. 18, 2011

(54) SYSTEM AND METHOD FOR LOAD BALANCING A VIDEO SIGNAL IN A MULTI-CORE PROCESSOR

(75) Inventor: Yong Yan, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 782 days.

(21) Appl. No.: 12/147,850

(22) Filed: Jun. 27, 2008

(65) Prior Publication Data

US 2009/0324108 A1  Dec. 31, 2009

(51) Int. Cl.
G06K 9/36 (2006.01)

(52) U.S. Cl. ......................... 382/232; 375/240

(58) Field of Classification Search .................. None
See application file for complete search history.

(56) References Cited

U.S. PATENT DOCUMENTS

| 6,870,883 | B2 * | 3/2005 | Iwata ....................... | 375/240.01 |
| 2007/0086528 | A1 * | 4/2007 | Mauchly et al. ......... | 375/240.24 |
| 2008/0151997 | A1 * | 6/2008 | Oguz ....................... | 375/240.02 |

OTHER PUBLICATIONS

Van der Tol et al; "Mapping of H.264 Decoding on a Multiprocessor Architecture"; Philips Research Laboratories, the Netherlands.

Iyer et al; "A Multi-Processor System for Video Coding Applications"; IEEE, 1997, pp. 210-213.

Hsia; "An Adaptive Video Coding Control Scheme for Real-Time MPEG Applications"; EURASIP Journal on Applied Signal Processing, 2003, pp. 244-251.

Meenderinck et al; "Parallel Scalability of H.264"; pp. 1-12.

* cited by examiner

*Primary Examiner* — Jason M Repko
*Assistant Examiner* — Siamak Harandi
(74) *Attorney, Agent, or Firm* — Daniel D. Hill; James L. Clingan, Jr.

(57) ABSTRACT

Sequential video data frames are encoded using cores including a first core and a second core. A first beginning frame is divided into slices. The first core is assigned to process a first slice. The second core is assigned to process a second slice. The first beginning frame is processed using the cores which results in a first ending frame in which the first slice was partitioned into a third slice and a fourth slice. The third slice was processed by the first core. The fourth slice and the second slice were processed by the second core. A second beginning frame, which immediately follows the first ending frame, is divided into a second plurality of slices. The first core is assigned to the third slice. The second core is assigned to a fifth slice which has a size equal to a sum of the second and fourth slices.

20 Claims, 3 Drawing Sheets

SYSTEM AND METHOD FOR LOAD BALANCING A VIDEO SIGNAL IN A MULTI-CORE PROCESSOR

BACKGROUND

1. Field

This disclosure relates generally to video processing, and more specifically, to a system and method for load balancing a video signal in a multi-core processor.

2. Related Art

The Advanced Video Coding (AVC) standard, Part 10 of MPEG4 (Motion Picture Experts Group), otherwise known as H.264, was developed to enable transmission or storing of video signals with improved quality at a constant bit rate (CBR), or variable bit rate (VBR). A present day encoder compliant with the H-264 standard can be designed to run on a single-core processor. However, a commonly available single-core processor is not capable of running fast enough to reach high-definition resolutions (e.g. 720p, 1080i, and 1080p). In order to reach high-definition resolutions in near real-time, the H.264 encoder can be designed to run in parallel on a multi-core processor.

To effectively encode a video signal in a multi-core processor, video data should be relatively evenly divided between the cores for parallel processing. This load balancing is generally achieved using either data partitioning or function partitioning. In data partitioning, a frame of data is divided into multiple portions and provided to the cores in parallel. This approach is relatively easily implemented. However, it is difficult to insure proper load balancing between processor cores because some of the data will have more complex processing requirements. For example, one slice of a frame may include movement, or finer details than another slice of the frame. This can lead to processing bottlenecks causing some cores to be idle while others are busy.

In load balancing using function partitioning each core is assigned a different processing function, such as motion estimating or encoding. The data is then processed in a pipelined fashion. For example, one processor may apply a first function to video data and then pass the modified data to a second processor for a second function. However, it can be difficult to load balance by function because algorithms cannot easily be divided into an arbitrary number of blocks to match the number of processor cores.

Therefore, what is needed is a system and method that solves the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
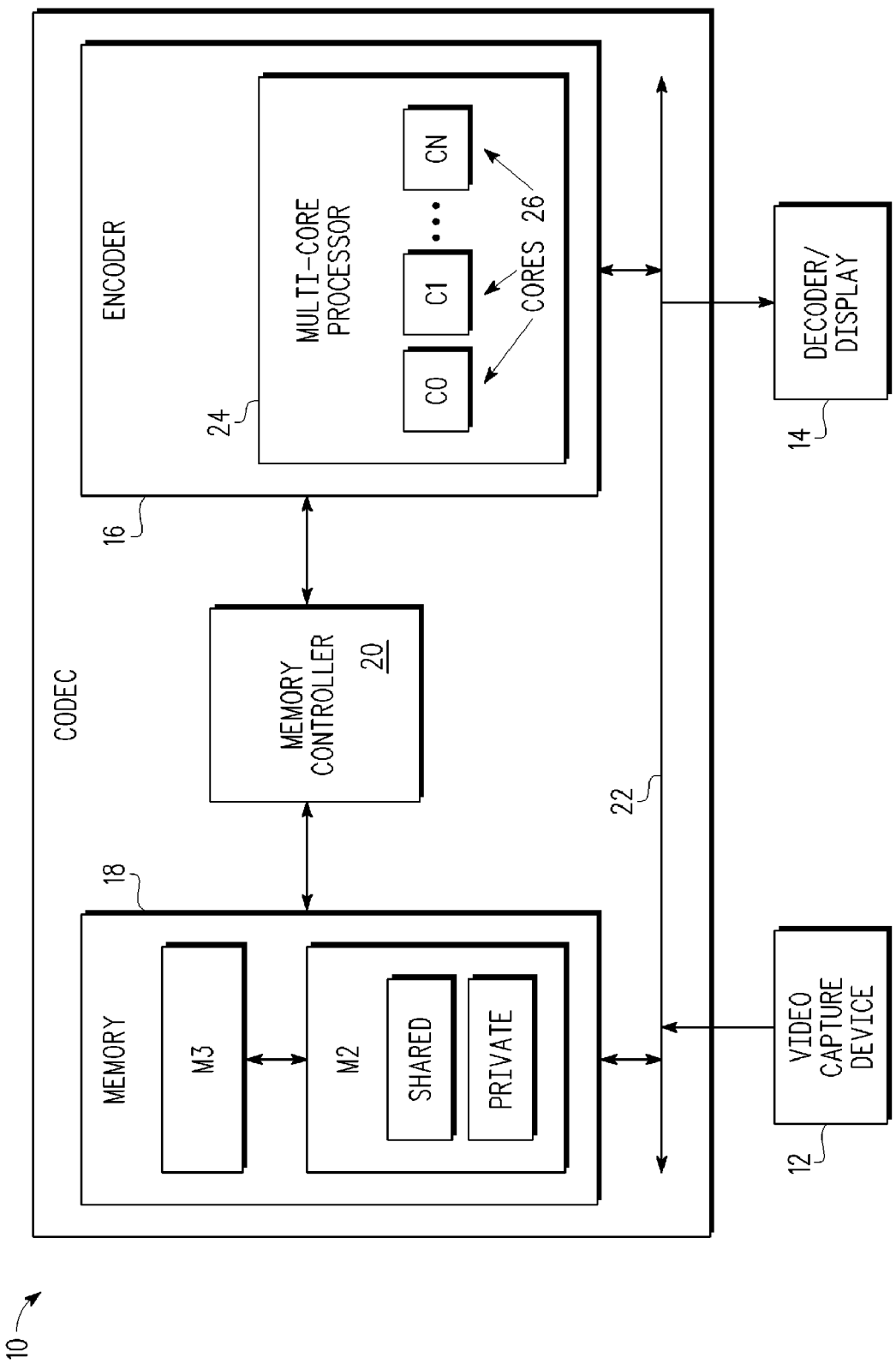
FIG. 1 illustrates, in block diagram form, a codec having a multi-core processor in accordance with an embodiment.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Generally, there is provided, a system and method for load balancing the encoding of a video signal in a multi-core processor that includes designating one core as a master and the other cores as slaves. A first frame is divided into slices and each slice is assigned to a core. The master core determines if the load is balanced between the cores while processing the first frame. If the load is unbalanced, and a core is doing more work than the other cores, the slice assigned to the overloaded core is divided into two or more smaller slices and the smaller slices are assigned to one or more other cores by the master core to reduce the work of the overloaded core. The redistribution is maintained until processing of the first frame is completed. Prior to beginning a second frame, the slices for each of the cores are resized based on the reassigned slice sizes at the end of the first frame. By reassigning slices to the cores during a second frame based on the load redistribution of a first frame, the work load of the cores can be more equally balanced throughout the encoding of a video signal.

In one aspect, there is provided, a method of encoding sequential video data frames using a plurality of cores comprising a first core and a second core. The method comprising: dividing a first beginning frame into a first plurality of slices among the plurality of cores in which the first core is assigned to process a first slice of the plurality of slices and the second core is assigned to process a second slice of the plurality of slices; processing the first beginning frame using the plurality of cores which results in a first ending frame in which the first slice was partitioned into a third slice and a fourth slice, wherein the third slice was processed by the first core and the fourth slice and the second slice were processed by the second core; and dividing a second beginning frame, which immediately follows the first ending frame, into a second plurality of slices among the plurality of cores in which the first core is assigned to the third slice and the second core is assigned to a fifth slice which has a size equal to a sum of the second and fourth slices. The plurality of cores may further comprise a master core and a plurality of slave cores. The step of processing the first beginning frame may be further characterized by the master core partitioning the slices according to a protocol. The step of dividing the second beginning frame may be further characterized by each of the plurality of cores being assigned to a slice having a plurality of macroblocks equal in number to the number of macroblocks processed on the first ending frame. The method may further comprise processing the second beginning frame using the plurality of cores to produce a second ending frame. The step of processing the second beginning frame may be further characterized as partitioning the second plurality of slices into a third plurality of slices greater in number than the second plurality of slices. The step of processing the second beginning frame may be further characterized by each slice of the third plurality of slices being processed by one of the plurality of cores, wherein each core processes a size equal to a sum of the sizes of the slices that it processes. The step of dividing the second beginning frame may be further characterized by the second plurality of slices being of a number of slices equal to a number of slices of the first plurality of slices. The second slice and the fourth slice may be non-adjacent.

In another aspect, there is provided, a method of processing frames. The method comprising: providing a processing unit comprising a plurality of cores of a first number; dividing a first beginning frame into a first plurality of slices of the first number, wherein each slice of the first plurality of slices has a size; assigning each core of the plurality of cores to a slice of the first plurality of slices, wherein each slice of the first plurality of slices has a core of the plurality of cores assigned to it; initially processing the first beginning frame with the plurality of cores processing the first plurality of slices as assigned according to the step of assigning each core of the plurality of cores to a slice of the first plurality of slices; finally processing the first beginning frame to produce a first ending frame, wherein the first ending frame has a second plurality of slices of a second number, wherein the second number is greater than the first number, wherein each core has processed at least one slice of the second plurality of slices and at least one core has processed more than slice of the second plurality of slices, wherein each core has processed an amount of the first ending frame equal to a sum of the slices processed by it; dividing a second beginning frame into a third plurality of slices of the first number; assigning each core of the plurality of cores to a slice of the third plurality of slices, wherein each slice of the third plurality of slices has a core of the plurality of cores assigned to it, wherein each core is assigned to an amount of the frame equal to the amount it processed on the first ending frame; and initially processing the second beginning frame with the plurality of cores processing the third plurality of slices as assigned according to the step of assigning each core of the plurality of cores to a slice of the third plurality of slices. The method may further comprise finally processing the second beginning frame to produce a second ending frame. The step of finally processing the second beginning frame to produce a second ending frame may be further characterized by the second ending frame comprising a fourth plurality of slices greater in number than the third plurality of slices. The step of finally processing the first beginning frame may be further characterized by a master core of the plurality of cores controlling the plurality of cores according to a protocol. The method may operate in compliance with H.264. The first beginning frame and the second beginning frame may comprise a plurality of macroblocks. A size equal to a sum of the first plurality of slices is equal to a size equal to a sum of the plurality of macroblocks. The method may further comprising initially processing a third beginning frame with the cores processing sizes equal to the sizes processed on the second ending frame.

In yet another aspect, there is provided, an encoder, comprising: a plurality of slave cores, wherein each slave core is capable of processing one or more slices of a frame; a master core that directs operation of the slave cores and is capable of processing one or more slices of a frame, wherein: the master core assigns itself and each slave core to a single slice of a first plurality of slices of a first beginning frame, wherein a number of slices of the first plurality of slices is equal to a number of slave cores plus one for the master core; the master core partitions the slices of the first plurality of slices to result in a second plurality of slices greater in number than the first plurality of slices according to a protocol based on relative complexity among the first plurality of slices; the master core selectively assigns itself and each slave core of the plurality of slave cores to process the second plurality of slices to a achieve a first ending frame, wherein a size processed by each core is in accordance with the protocol; and the master core assigns itself and each slave core to a single slice of a third plurality of slices of a second beginning frame, wherein a number of slices of the third plurality of slices is equal to a number of slices of the first plurality of slices and less than a number of slices of the second plurality of slices; wherein each slave core is assigned to a slice having a size equal to the size processed by it in achieving the first ending frame. The encoder may further comprise a memory shared among the master core and the slave cores. The first beginning frame may comprise a plurality of macroblocks, wherein a size equal to a sum of the first plurality of slices is equal to a size equal to a sum of the plurality of macroblocks which is equal to a size of a sum of the second plurality of slices.

FIG. 1 illustrates, in block diagram form, a codec 10 having a multi-core processor 24 in accordance with an embodiment. Codec 10 is implemented as one or more integrated circuits and includes encoder block 16, memory block 18, memory controller 20, and bus 22. Encoder 16 includes a multi-core processor 24. Processor 24 includes a plurality of data processing cores 26 labeled C0, C1, and CN. Memory 18 includes a memory block labeled "M2" and a memory block labeled "M3". In one embodiment, memory block M2 is a low latency SRAM (static random access memory) that allows up to four simultaneously accesses. In another embodiment, memory block M2 may be a different type of memory. A portion of M2 is shared by each of cores 26 of processor 24. Also, portions of M2 are private to each core of the plurality of cores 26. In addition, memories M2 and M3 are bi-directionally coupled together. Memory controller 20 is bi-directionally coupled to both memory 18 and to encoder 16 for controlling accesses to memory 18. Data can be communicated from memory 18 to encoder 16 via bus 22 to directly via memory controller 20.

The plurality of cores 26 can include any number of data processing cores. In one example, cores 26 are digital signal processors (DSPs). In another example, cores 26 are general purpose processors. Bus 22 comprises a plurality of conductors and is coupled to memory 18, encoder 16, a video capture device 12, and display 14. In one embodiment, video data is provided to memory 18 via bus 22 by the video capture device 12. Video capture device 12 may be, for example, a video camera. The video data is retrieved from memory 18 by encoder 16 for processing. The processed data is then provided to decoder/display 14 to be decoded and then displayed, or to communication channels to be transmitted, or to storages to be recorded (not shown). The display of decoder/display 14 may be, for example, a personal computer or a video monitor. Although not illustrated in FIG. 1, other components may also be coupled to bus 22.

Figure 2:
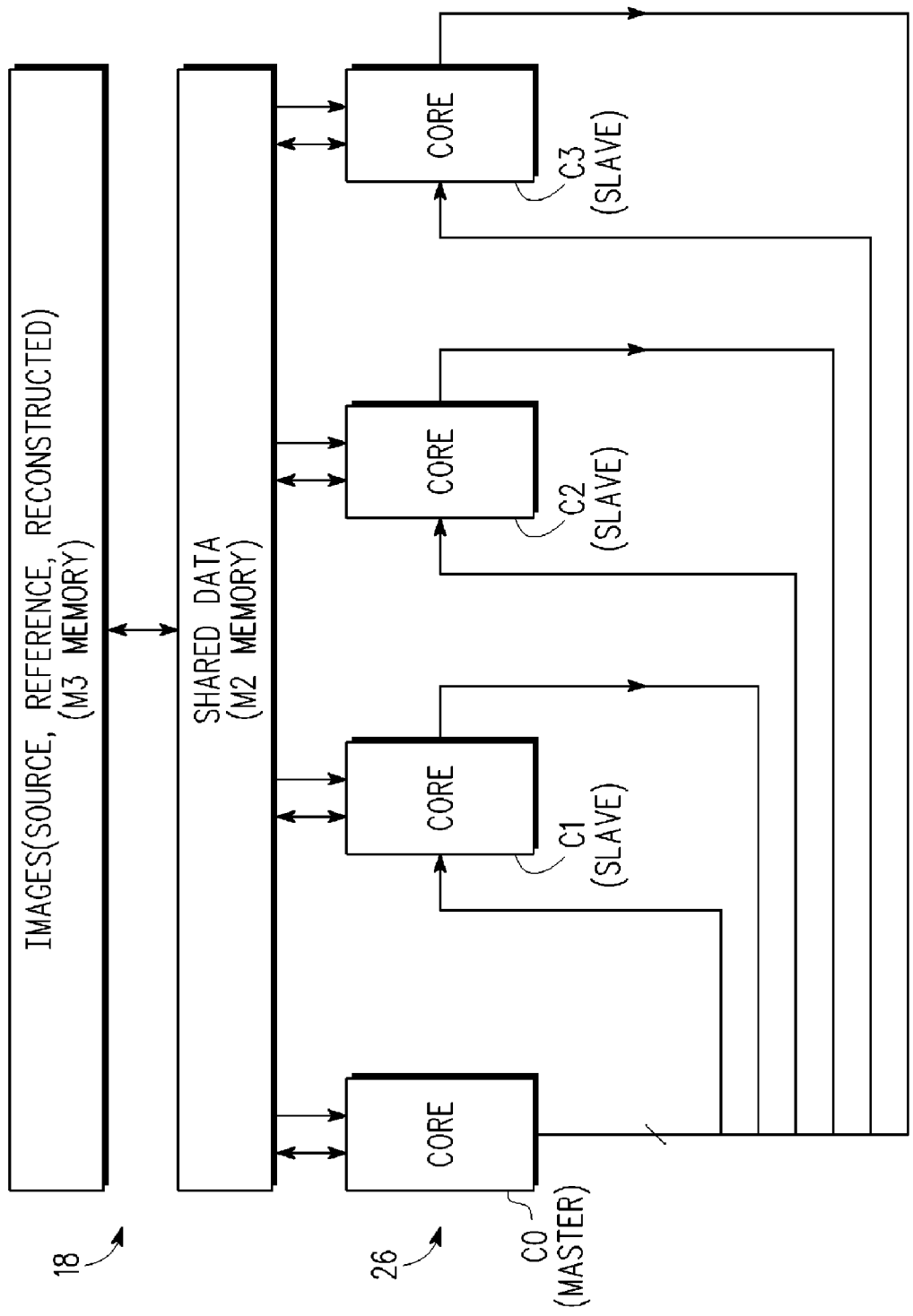
FIG. 2 illustrates, in block diagram form, the multi-core processor of FIG. 1 in more detail.

FIG. 2 illustrates, in block diagram form, portions of FIG. 1 in more detail. In accordance with the illustrated example, plurality of cores 26 includes four (4) cores designated C0, C1, C2, and C3. The cores are configured in software to have a Master-Slave relationship, where core C0 is the "master" and cores C1, C2, and C3 are the "slaves". In the illustrated example, the master core makes all of the decisions in addition to processing data. The slave cores only process data. As can be seen in FIG. 2, master core C0 is coupled to each of cores C1, C2, and C3 for monitoring and controlling the operation of each of cores C1, C2, and C3. Each slave core has an input port and an output port coupled to the master core for receiving and providing control information. Each core is also coupled to the shared memory M2. Image data from, for example, video capture device 12 is first stored in memory M3 in frames. The image data is then provided to memory M2, and then provided the cores.

A frame of video data is partitioned into slices. For higher quality, frames should be partitioned into as few slices as possible. In one embodiment, the number of slices is equal to the number of cores. For example, in the four core system of FIG. 2, the frames are initially partitioned into four equal sized slices, a slice for each of the four cores. In another embodiment, the slices may not be equal sizes, for example, the master core may receive a smaller slice because it also must provide the control functions. The slices are processed from left to right and top to bottom in 16×16 pixel macroblocks. The slice size is determined and adjusted dynamically by master core C0. Master core C0 monitors the progress of the slave cores. If, after processing a few macroblocks of the frame, the load does not appear to be equally distributed between the cores, the master core changes the slice sizes to more equally distribute the load for the rest of the frame. For example, if core C0 is getting behind relative to the other cores, a portion of the slice assigned to core C0 will be assigned to another core. The assignment can be based on the relative work loads of each of the other cores. For the next frame the slice sizes will modified based on the work load redistribution from the current frame.

Figure 3:
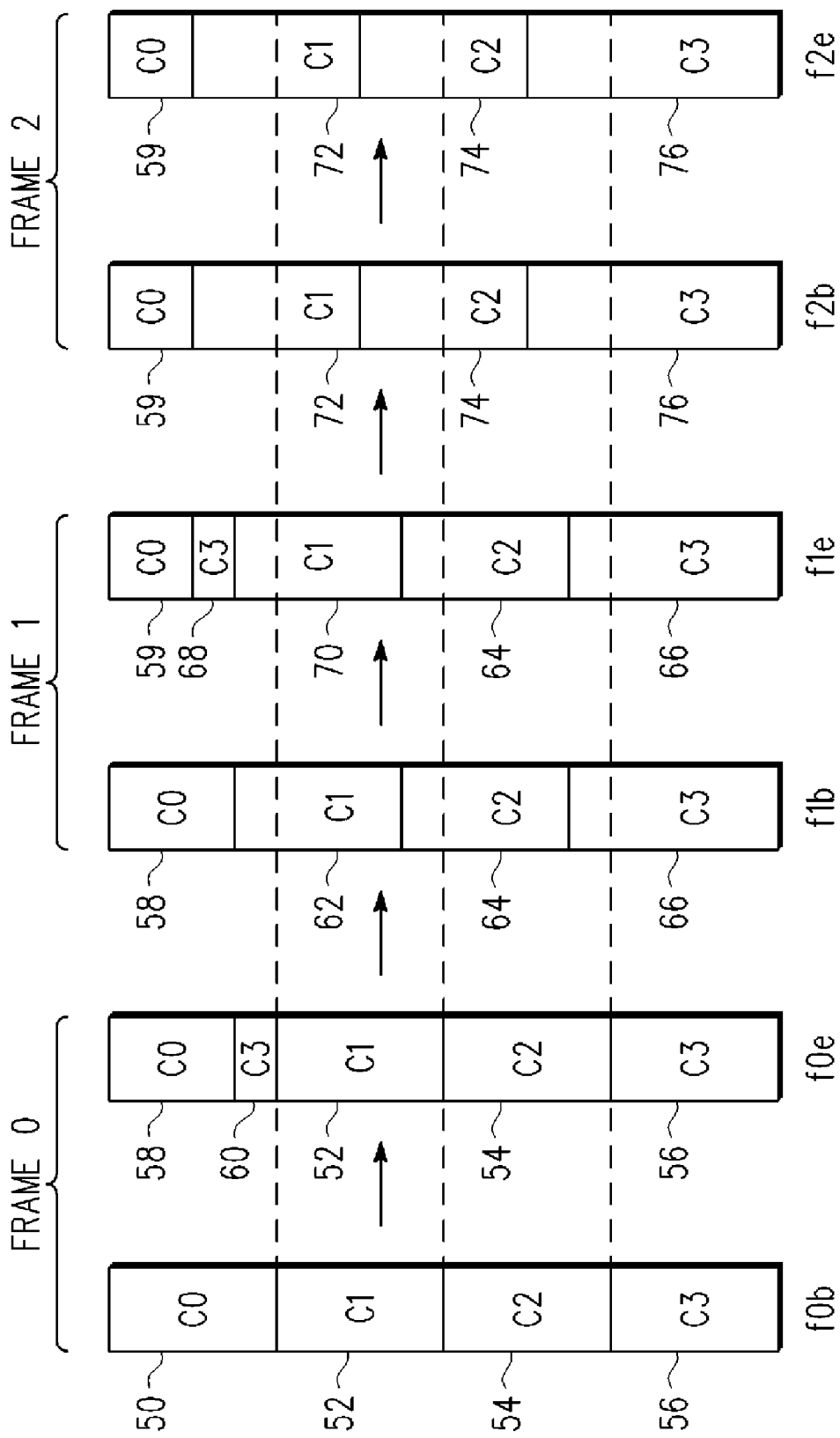
FIG. 3 illustrates data partitioning of a frame of video data in the multi-core processor of FIG. 2 in accordance with an embodiment.

FIG. 3 illustrates an example of data partitioning of frames of video data in the multi-core processor of FIG. 2 in accordance with an embodiment. The example of FIG. 3 includes three sequential frames: FRAME 0, FRAME 1, and FRAME 2. Each of the three frames is divided into a beginning portion and an ending portion. There may be a middle portion between the beginning portions and ending portions of each frame that is not shown. For example, FRAME 0 includes a beginning portion (in time) labeled "f0b" and an ending portion (in time) labeled "f0e". Likewise, FRAME 1 includes a beginning portion labeled "f1b" and an ending portion labeled "f1e", and FRAME 2 includes a beginning portion labeled "f2b" and an ending portion labeled "f2e". For purposes of illustration, beginning portion f0b of FRAME 0 is divided into 4 equal slices, that is, each slice has the same number of macroblocks. As illustrated, a slice 50 of beginning portion f0b is assigned to core C0, a slice 52 is assigned to core C1, a slice 54 is assigned to core C2, and slice 56 is assigned to C3. Arrows between the beginning and ending portions indicate that processing of the frames moves from left to right. Also, dashed lines are provided to give a reference from which to visualize load changes between the cores. Master core C0 determines if the load is more or less balanced between the cores according to a predetermined protocol. The protocol may use the relative processing complexity of the slices to determined core loading. By way of example, assume that the load is not balanced between the cores and core C0 is doing more of the work than the other cores. At ending f0e of FRAME 0, slice 50 has been divided into slices 58 and 60 and slice 60 has been reassigned to core C3 because it has been determined that core C3 is currently doing less work than the other cores. Therefore, at the end portion f0e of FRAME 0, core C0 is processing slice 58, core C1 is processing slice 52, core C2 is processing slice 54 and core C3 is processing slices 56 and 60. Note that at ending portion f0e, core C3 is processing two non-adjacent slices. The result is that Core C0 will have a smaller slice to process at ending portion f0e than at beginning portion f0b of FRAME 0.

At beginning portion f1b of FRAME 1, each core is given the same size slice as was assigned at ending portion f0e as can be seen in FIG. 3 with reference to the dashed lines. For example, slice 58 of beginning portion f1b has the same number of macroblocks as slice 58 of ending portion f0e of FRAME 0. The slice boundaries were determined by adding a slice equivalent to the size of slice 60 to slice 56, thus creating slice 66. To keep slice sizes the same for the other cores, the boundaries move up so that core C0 still processes a smaller slice 58 of FRAME 1, core C1 has a slice 62, core C2 has a slice 64, and core C3 has a slice 66. Note that slice 66 is equivalent in size to the combination of slices 60 and 56 at ending f0e, slice 62 is equivalent in size to slice 52, and slice 64 is equivalent in size to slice 54. While processing FRAME 1, core C0 determines, for example, that core C0 still has more of the load than the other cores and core C3 has less of the load. Core C0 then divides slice 58 into slices 59 and 60 and gives core C3 responsibility for processing slices 66 and 68. The load of core C0 is reduced, the loads of cores C1 and C2 remain the same, and the load of core C3 is increased as can be seen at ending portion f1e of FRAME 1. When processing of FRAME 2 begins at beginning portion f2b, the slice sizes provided to each of the cores remains as assigned at ending portion f1e. Core C0 processes slice 59 in FRAME 2 which as been reduced in size by an amount equivalent to the size of slice 68 (from ending portion f1e). Core C3 processes slice 76 which is increased in size over slice 66 by an amount equivalent to the size of slice 68. While processing FRAME 2, core C0 determines that the load is optimally balanced and does not redistribute the load at ending f2e of FRAME 2. Processing continues for each successive frame as described above. Each encoded frame is provided to bus 22 of codec 10 where the encoded frames may be stored in memory, displayed, or provided to another device not illustrated in FIG. 1. As the video being encoded changes, processing demands on the cores change, and the master core monitors and reassigns slice sizes so that the load assigned to each core remains relatively constant, or balanced.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of codec 10 are circuitry located on multiple die in a single integrated circuit package. Alternatively, codec 10 may be included on a single integrated circuit. Also for example, codec 10 or portions thereof may be soft or code representations of physical circuitry or of logical representations convertible into physical circuitry. As such, codec 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of encoding sequential video data frames using a plurality of cores comprising a first core and a second core, the method comprising:
   dividing a beginning portion of a first frame into a first plurality of slices among the plurality of cores in which the first core is assigned to process a first slice of the plurality of slices and the second core is assigned to process a second slice of the plurality of slices;
   processing the first frame using the plurality of cores;
   partitioning the first slice into a third slice and a fourth slice, wherein the third slice is processed by the first core and the fourth slice and the second slice are processed by the second core; and
   dividing a second frame, which immediately follows the first ending frame, into a second plurality of slices among the plurality of cores in which the first core is assigned to a fifth slice equivalent in size to the third slice and the second core is assigned to a sixth slice which has a size equal to a sum of the second and fourth slices.

2. The method of claim 1, wherein the plurality of cores comprises a master core and a plurality of slave cores.

3. The method of claim 2, wherein the step of processing the first frame is further characterized by the master core partitioning the slices according to a protocol.

4. The method of claim 3, wherein the step of dividing the second frame is further characterized by each of the plurality of cores being assigned to a slice having a plurality of macroblocks equal in number to the number of macroblocks processed on the first frame.

5. The method of claim 1, further comprising:
   processing the second frame using the plurality of cores to produce a modified second frame.

6. The method of claim 5, wherein the step of processing the second frame is further characterized as partitioning the second plurality of slices into a third plurality of slices greater in number than the second plurality of slices.

7. The method of claim 6, wherein the step of processing the second frame is further characterized by each slice of the third plurality of slices being processed by one of the plurality of cores, wherein each core processes a slice having a size equal to a sum of the sizes of the slices that it processed at an end of the first frame.

8. The method of claim 1, wherein the step of dividing the second frame is further characterized by the second plurality of slices being of a number of slices equal to a number of slices of the first plurality of slices.

9. The method of claim 1, wherein the second slice and the fourth slice are non-adjacent.

10. A method of processing frames, comprising:
   providing a processing unit comprising a plurality of cores of a first number;
   dividing a first frame into a first plurality of slices of the first number, wherein each slice of the first plurality of slices has a size;
   assigning each core of the plurality of cores to a slice of the first plurality of slices, wherein each slice of the first plurality of slices has a core of the plurality of cores assigned to it;
   initially processing a beginning portion of the first frame with the plurality of cores processing the first plurality of slices as assigned according to the step of assigning each core of the plurality of cores to a slice of the first plurality of slices;
   processing an ending portion of the first frame, wherein the ending portion of the first frame has a second plurality of slices of a second number, wherein the second number is greater than the first number, wherein each core has processed at least one slice of the second plurality of slices and at least one core has processed more than slice of the second plurality of slices, wherein each core has processed an amount of the first ending frame equal to a sum of the slices processed by it;
   dividing a beginning portion of a second frame into a third plurality of slices of the first number;
   assigning each core of the plurality of cores to a slice of the third plurality of slices, wherein each slice of the third plurality of slices has a core of the plurality of cores assigned to it, wherein each core is assigned to an amount of the frame equal to the amount it processed on the ending portion of the first frame; and initially processing the beginning portion of the second frame with the plurality of cores processing the third plurality of slices as assigned according to the step of assigning each core of the plurality of cores to a slice of the third plurality of slices.

11. The method of claim 10, further comprising:
finally processing the second frame to produce a modified second frame.

12. The method of claim 11, wherein the step of finally processing the second frame is further characterized by an ending portion of the second frame comprising a fourth plurality of slices greater in number than the third plurality of slices.

13. The method of claim 10, wherein the step of processing an ending portion the first frame is further characterized by a master core of the plurality of cores controlling the plurality of cores according to a protocol.

14. The method of claim 10, wherein the method operates in compliance with standard H.264.

15. The method of claim 10, wherein the first frame and the second frame comprise a plurality of macroblocks.

16. The method of claim 15, wherein a size equal to a sum of the first plurality of slices is equal to a size equal to a sum of the plurality of macroblocks.

17. The method of claim 10, further comprising initially processing a third frame with the cores processing sizes equal to the sizes processed at the ending portion of the second frame.

18. An encoder, comprising:
a plurality of slave cores, wherein each slave core is configured to process one or more slices of a frame;
a master core that directs operation of the slave cores and is configured to process one or more slices of a frame, wherein:

the master core is configured to assign itself and each slave core to a single slice of a first plurality of slices of a beginning portion of a first frame, wherein a number of slices of the first plurality of slices is equal to a number of slave cores plus one for the master core;

the master core is configured to partition the slices of the first plurality of slices to result in a second plurality of slices greater in number than the first plurality of slices according to a protocol based on relative processing complexity among the first plurality of slices;

the master core is configured to selectively assign itself and each slave core of the plurality of slave cores to process the second plurality of slices at an ending portion of the first frame, wherein a size of slice processed by each core is in accordance with the protocol; and the master core is configured to assign itself and each slave core to a single slice of a third plurality of slices of a beginning portion of a second frame, wherein a number of slices of the third plurality of slices is equal to a number of slices of the first plurality of slices and less than a number of slices of the second plurality of slices; wherein each slave core is assigned to a slice having a size equal to the size processed by it during the ending portion of the first frame.

19. The encoder of claim 18, further comprising a memory shared among the master core and the slave cores.

20. The encoder of claim 18, wherein the beginning portion of the first frame comprises a plurality of macroblocks, wherein a size equal to a sum of the first plurality of slices is equal to a size equal to a sum of the plurality of macroblocks which is equal to a size of a sum of the second plurality of slices.

\* \* \* \* \*